April 4, 1967  H. B. LIT  3,312,773
INSULATED ELECTRIC CONDUCTOR AND METHOD OF MAKING THE SAME
Filed Aug. 23, 1965

INVENTOR:
HARRY B. LIT,
BY J Wesley Hawkner
ATTORNEY

United States Patent Office 3,312,773
Patented Apr. 4, 1967

3,312,773
INSULATED ELECTRIC CONDUCTOR AND
METHOD OF MAKING THE SAME
Harry B. Lit, West Peabody, Mass., assignor to General
Electric Company, a corporation of New York
Filed Aug. 23, 1965, Ser. No. 481,528
3 Claims. (Cl. 174—119)

My invention relates to insulated electric conductors and to an improved method of making the same. More particularly the invention relates to partially work-hardened, high tensile strength insulated conductors suitable for winding electric coils, either in single conductor or stranded cable form.

The trend toward larger capacity in electric power systems and their component apparatus is evident in the increasing size and power of electric induction apparatus such as power transformers. As the power and size of transformers and the systems to which they are connected is increased, available short circuit currents become sufficiently large that the mechanical strength of transformer coils tends to become a limiting design feature. In such coils radial forces upon the coil conductors under high overload and short circuit conditions may create tensile stress in the conductors so great that the cross section of soft copper conductor required by electrical design considerations alone would not be sufficient to resist mechanical deformation. This is especially true in an outer secondary winding wound concentrically over an inner primary winding, as in a shell type transformer. In such a structure leakage flux between the windings exerts a radially outward force on the secondary winding which must be counteracted almost entirely by tension in the winding conductor.

It is known that copper conductor for use in winding electric coils can be cold worked, as by cold rolling, to increase its hardness and tensile strength. Such conductor, however, is ordinarily coated with insulating varnish to provide turn insulation, and the varnishes commonly used are thermosetting resin compositions having curing temperatures above the annealing temperature of the copper. Thus cold working prior to varnish coating may be ineffective because a substantial degree of annealing may unavoidably take place during the varnish-curing operation. This is particularly true with the smaller size conductors. It is also known to cold roll insulated conductor or fixed stock size to any one of several selected final sizes, primarily for the purpose of minimizing the number of wire sizes kept in stock. Conductor so worked with regard only to final size has generally been found too hard and stiff to use in cable or coil formation.

I have discovered, however, that by accurately predetermining and controlling the amount of cold rolling after insulation (i.e. post rolling), a conductor having several times the tensile strength of annealed copper may be produced without so hardening the conductor as to render it unduly difficult to use in cable or coil formation. The final hardness may be further controlled by alloying with the copper another material, such as cadmium, which raises the annealing temperature to such a point that only incomplete annealing is effected during the varnish-curing operation.

It is accordingly an object of my invention to provide an improved high tensile strength insulated electric conductor and method of making the same.

Another object of my invention is the provision of a new and improved method of making high tensile strength electric conductor suitable for use in stranded cable and coil formation.

A still further object of the invention is the provision of a method of forming an insulated electric conductor whereby a predetermined selected amount of work hardening less than a maximum amount can be effected after insulating and annealing of the conductor.

It is a particular object of the invention to provide an improved high tensile strength copper conductor having a predetermined proportion of maximum cold-worked hardness and insulated with a thermosetting insulating material requiring curing at or above the annealing temperature of the copper.

In carrying out my invention in one preferred embodiment, I utilize copper conductor of circular cross-section coated with a thermosetting resinous insulating material having a high degree of shear strength and flexibility in the cured condition. Following the insulating operation, such conductor is generally quite soft as a result of full or partial annealing at the resin-curing temperature. After curing of the insulation, therefore, I cold roll the conductor from circular to substantially rectangular shape in equipment designed to produce an approximately 9% reduction in cross-sectional area of the conductor. The cold working resulting from this post-rolling operation has been found sufficient to produce about one-fourth hardening. By this is meant that the increase in hardness due to cold working in the rolling operation is about one-fourth the maximum increase in hardness which is attainable by cold working of the material. Such partially hardened material has appreciably greater strength than the soft annealed copper, but it is still sufficiently flexible to permit such working of the conductor as is required in the formation of stranded cable and the winding of electric coils.

My invention will be more fully understood and its various objects and advantages further appreciated by referring now to the following detailed specification taken in conjunction with the accompanying drawing in which.

Figure 1:
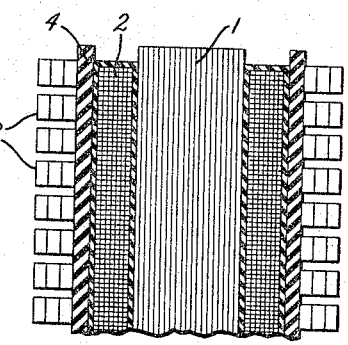
FIG. 1 is an axial cross-sectional view of a typical power transformer showing primary and secondary coils for the winding of which my improved conductor is particularly suited.

In the drawing I have illustrated at FIG. 1 a transformer comprising a magnetizable core 1 having wound thereon a primary winding 2 illustrated schematically, and a concentric secondary winding 3 formed of radially stacked disk-like sections of rectangular conductor. Between the primary and secondary windings there is shown a cylinder of insulating material 4 serving as a form upon which the secondary winding 3 is wound. Prior to winding in coil form the rectangular conductor of the secondary winding 3 is coated with a suitable thermosetting insulating resin and thereafter reduced in cross-section by cold rolling to increase its strength and hardness to a predetermined degree. As will be more fully explained hereinafter the deformation of conductor 3 in the cold rolling operation is so controlled that the degree of resultant hardening is less than the maximum increase in hardness obtainable by cold working of the particular material used.

In forming my improved high tensile strength insulated conductor, the cross-sectional area of the final conductor needed to meet current-carrying and heating specifications is determined by methods well known to those skilled in the art. The final cross-sectional configuration will be characterized by flatness due to the contemplated post-rolling operation, so that the final configuration will be substantially rectangular. From these considerations and the amount of cold working desired in rolling the size of the starting conductor may be determined. Neither the cross-sectional configuration nor the cross-sectional area of the starting conductor is alone significant, but the amount of deformation between that shape and the final cross-sectional shape is of importance. In the interest of simplicity and low cost, however, it is convenient to utilize round conductor as stock and to roll it without edge constraint so that some reduction in cross-sectional area occurs during rolling. The amount of area reduction then becomes significant as a measure of the amount of deformation in rolling.

In a preferred embodiment of my invention I cold roll the insulated conductor between a single pair of rolls spaced apart to produce a reduction in cross-sectional area of approximately 8 to 10 percent without appreciable tension on the conductor leaving the rolls. I have found that by this amount of cold working there is introduced into copper stock a sufficient amount of hardness to materially increase its tensile strength without unduly limiting its flexibility. Thus a circular starting conductor may be selected having a cross-sectional area about 10% greater than that ultimately desired in the final rectangular form.

Thus in preparing my improved conductor, I begin with a starting conductor primarily of copper and having a cross-sectional area at least equal to and preferably no more than about 10 percent greater than the cross-sectional area ultimately desired. This starting conductor is first insulated by dipping in a suitable thermosetting varnish and exposure to a temperature sufficiently high to set and cure the varnish. The insulating varnish used must be one which is flexible and possessed of high shear strength and toughness after curing. Such a material may, for example, be a phenol-aldehyde modified polyvinyl formal resin of the type described and claimed in Patent 2,307,588, Jackson and Hall. Such a material has a curing temperature of the order of 300 to 400 degrees C., and electric conductor insulated with such material is known commercially as "Formex." Another suitable resinous insulating material suitable for use in carrying out my invention is a polyester resin such as that described and claimed in Patent 2,936,296, Precopio and Fox. Another suitable insulating material is a polyamide resin such as that described and claimed in Patent 3,179,614, Edwards. All the foregoing resins are thermosetting materials which are tough and flexible after curing, and have curing temperatures sufficiently high to effect appreciable or substantially full annealing of copper within the time period required for curing the insulation.

After insulating a round or other starting conductor with a material of the type described above, the conductor is in a soft annealed condition if formed of pure or substantially pure copper. Copper is generally annealed by heating to a temperature between 250 degrees C. and 400 degrees C., but annealing at a slow rate is initiated at lower temperatures in the region of 150 degrees C. For electrical use it is desired that the conductor be primarily of copper, but, if desired, there may be alloyed with the copper small amounts of a material which increases the annealing temperature. Such an alloy will experience less than complete annealing during the insulation curing operation if the curing temperature is only slightly above the annealing temperature. One such alloy material is cadmium, and we contemplate that the copper composition utilized in forming conductor according to my invention may include an amount of cadmium, for example, two to six percent by weight which is sufficient to prevent undesired annealing of the copper under permissible transformer overload conditions. This amount of alloyed cadmium serves also to limit the amount of annealing which takes place in curing of the insulation. Even with cadmium present, however, a substantial amount of annealing occurs during curing of the insulation, and it is desirable that tensile strength be increased after curing.

Figure 2:
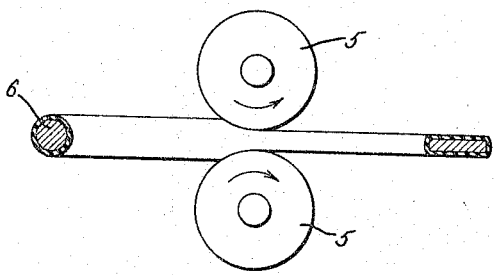
FIG. 2 is a schematic illustration of a rolling equipment and a post-rolling operation used in producing conductor according to my invention.

In order to increase tensile strength and hardness of the insulated conductor after curing of the insulation, I cold roll round conductor stock to a flattened form. By changing cross-sectional configuration by a predetermined amount I effect by cold working a desired fractional increase in hardness less than the maximum available increase. In this operation it is not essential that the cross-sectional area of the conductor be diminished so long as its configuration is changed sufficiently to effect the desired fractional amount of cold working and hardening. In a simple rolling operation however without backup of the edges of the conductor and without the application of appreciable tension to the conductor leaving the rolls, it is found that a reduction in cross section ordinarily takes place. The amount of this reduction depends, of course, upon the tension applied to the leaving end of the conductor, upon the reduction in thickness effected by the rolls, and to some degree upon the size and diameter of the rolls. I have found that if these factors are so proportioned that the insulated entering conductor is reduced in cross section by about 5 to 15 percent of its original cross-sectional area, and preferably reduced by about 9 percent of its original area, there is effected a partial hardening sufficient to increase tensile strength very considerably without detrimentally reducing flexibility. Specifically I have discovered that an area reduction of 9 percent by cold rolling will result in an increase in hardness of about 25 percent of the maximum increase which is attainable by cold rolling. Such a rolling and reducing operation is illustrated at FIG. 2 wherein an insulated circular conductor 6 is passed between reducing rolls 5 and emerges in substantially rectangular form and of reduced cross-sectional area.

Figure 3:
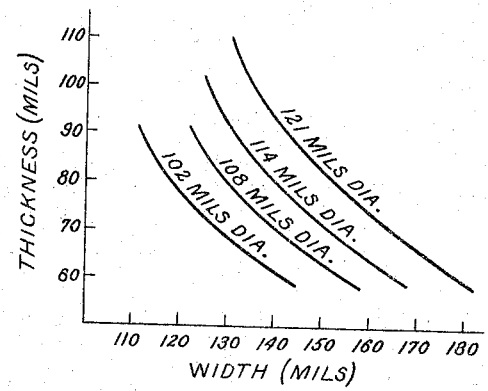
FIG. 3 is a selection chart in graphical form by means of which circular conductor of proper size may be selected for the production according to my invention of rectangular condutcor of predetermined dimension.

With a predetermined percentage of area reduction in post-rolling as an objective, it is possible to calculate the size of circular starting conductor which must be utilized for any desired width and length of rectangular final conductor. Such calculations may be illustrated graphically as shown at FIG. 3. In this figure the chart indicates as abscissa and ordinate, respectively, the width and thickness in mils of the final rectangular or substantially rectangular conductor. The family of generally parabolic curves on the chart represent the sizes of circular starting conductor which should be used to obtain the desired final rectangular area. The sizes of circular starting conductor are indicated on the several curves diameter in mils.

It has been found in actual operation that starting conductor of round cross-section in the sizes indicated on the chart at FIG. 3 will result after rolling in rectangular conductor having the width and thickness dimensions indicated at the several points along any one of these curves. It will be noted that if area calculations are made of the circular conductor and of the rectangular conductor having the width and thickness indicated, there is no apparent reduction in cross-sectional area. This is the result of the error introduced by the fact that the side edges of conductor rolled from round to flat configuration are in themselves curved, so that the final area is in fact less than that indicated by the product of the thickness and outside width dimensions. It has been found in actual operation that rolling of the circular conductor sizes shown on the chart to the thickness and outside width dimensions indicated does, in fact, result in an approximately 9 percent reduction in cross-sectional area.

It will be understood, of course, that there is no sharp criticality associated with a 9 percent reduction in area, and that the benefits of partial, but substantially less than full, hardening in accordance with my invention may be obtained by rolling to area reductions of the same general order of magnitude, for example of the order of 5 to 15 percent area reduction. It will be further understood, as pointed out hereinbefore, that cold working by post-rolling, and hence partial hardening, may also be accomplished without any area reduction so long as change in shape is sufficient to produce the desired degree of cold-working. Such an arrangement, however, would require the provision of additional complex equipment to prevent area reduction in the rolling operation.

Figure 4:
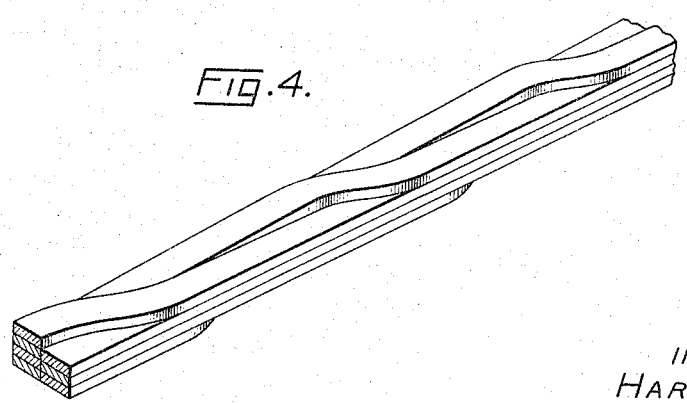
FIG. 4 is a fragmentary prospective view of a transposed stranded cable formed from conductor embodying my invention.

At FIG. 4 I have shown a typical stranded cable formed of insulated flat electrical conductor embodying my invention. In this cable the several strands are transposed for electrical balance. The cable may be formed by equipment such as that illustrated and described in Patent 3,154,112—St. Jacques. I have discovered that the limited degree of hardening described above does not adversely affect the flexibility of conductor used in the formation of such stranded cable. While the conductor is of course more difficult to bend in the transposing operation than is a cable formed of thoroughly annealed copper, I have discovered that the presence on the conductor of the tough flexible resinous insulating material described above so facilitates the transposing operation that the limited degree of hardening described may be readily tolerated.

While I have described a preferred embodiment of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. The method of making a high tensile strength electric conductor adapted for use in winding an electric coil which comprises forming an elongated conductor of copper alloyed with approximately 2% to 6% by weight of cadmium, said conductor having a predetermined cross-sectional area and configuration, coating said conductor with a flexible thermosetting insulating resin, heating the coated conductor to cure said resin at a temperature sufficient to at least initiate annealing of said conductor, and thereafter cold rolling the coating conductor to deform its cross section and harden said conductor to a hardness less than the maximum hardness attainable by cold working of the conductor.

2. The method of claim 1 wherein heating of said conductor to cure the coating is sufficient to appreciably anneal the conductor and wherein said cold rolling is utilized to reduce the conductor cross sectional area by an amount of the order of 5% to 15%.

3. A work-hardened insulated electric conductor formed of a metal alloy comprising at least 94% by weight of copper and 2% to 6% by weight of cadmium and provided with a coating of flexible thermosetting resin cured in situ at a temperature above the annealing temperature of the alloy, said coated conductor being cold rolled to deform its cross sectional configuration in an amount sufficient to increase its hardness by less than one-half the maximum increase in hardnes attainable by cold working.

References Cited by the Examiner

UNITED STATES PATENTS

| | | | |
|---|---|---|---|
| 1,307,642 | 6/1919 | Smith | 75—153 |
| 2,286,759 | 6/1942 | Patnode | 72—46 |
| 2,307,588 | 1/1943 | Jackson | 174—121 |

LEWIS H. MYERS, *Primary Examiner.*

E. GOLDBERG, *Assistant Examiner.*